April 28, 1942.   H. E. SOMES   2,281,297
INDUCTION HEAT TREATING APPARATUS
Filed Aug. 17, 1936   10 Sheets-Sheet 1
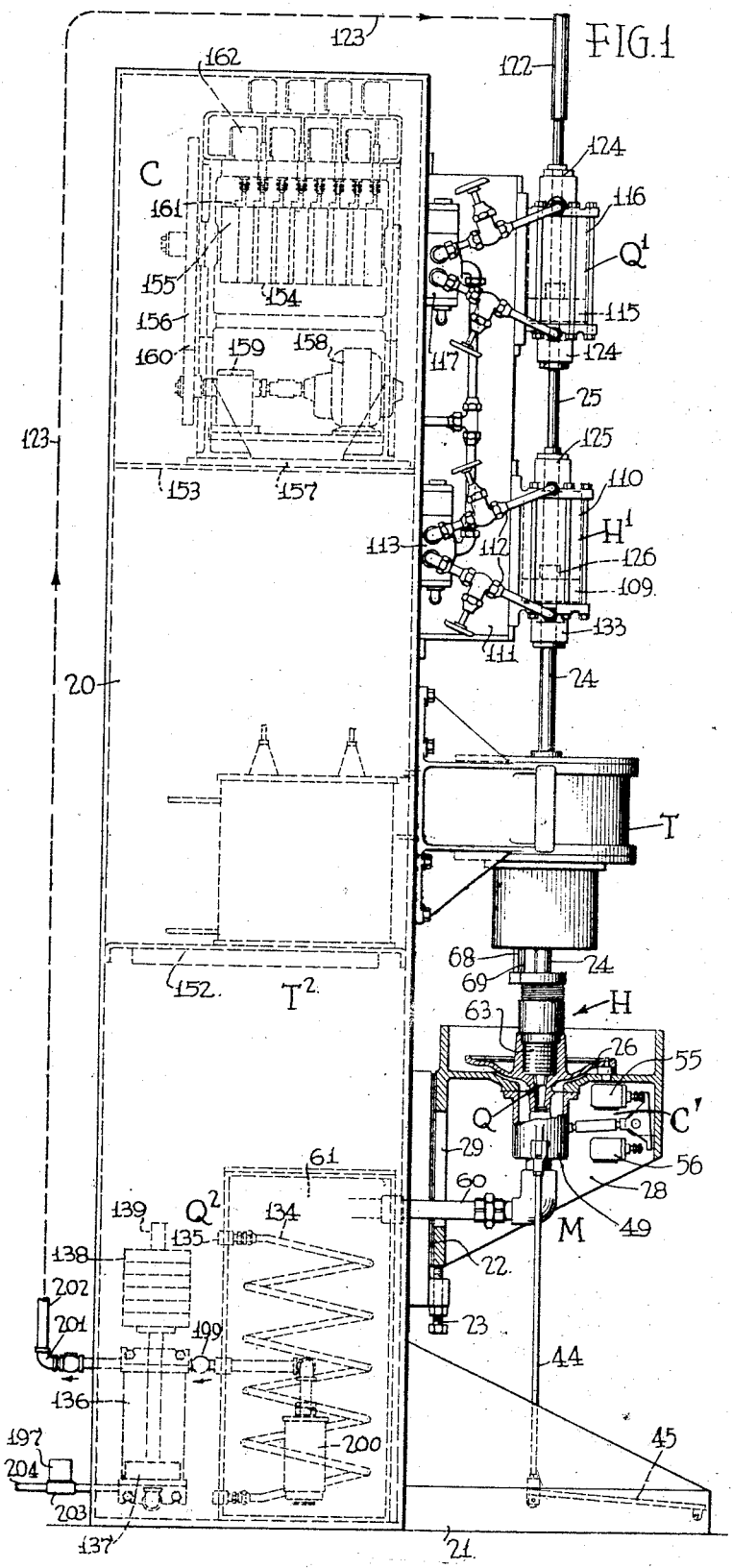
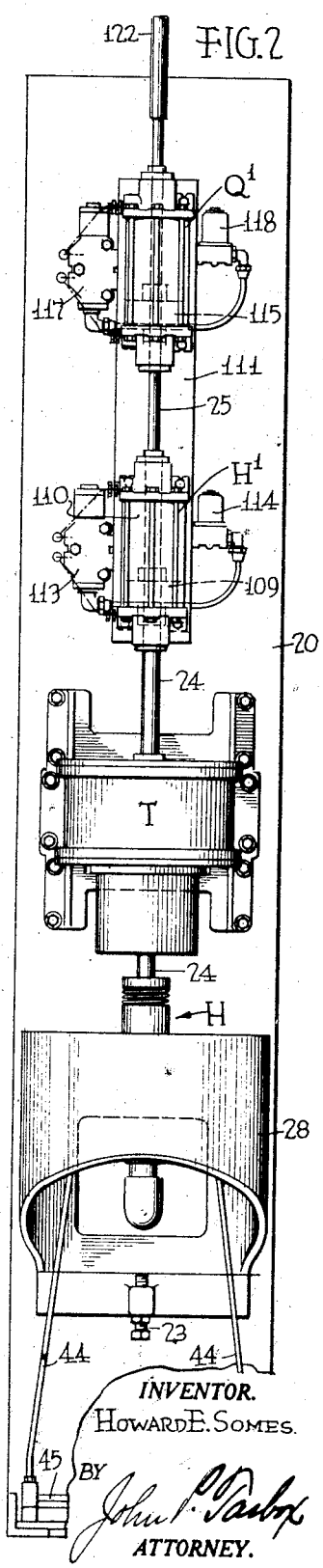
INVENTOR.
HOWARD E. SOMES.
BY
ATTORNEY.

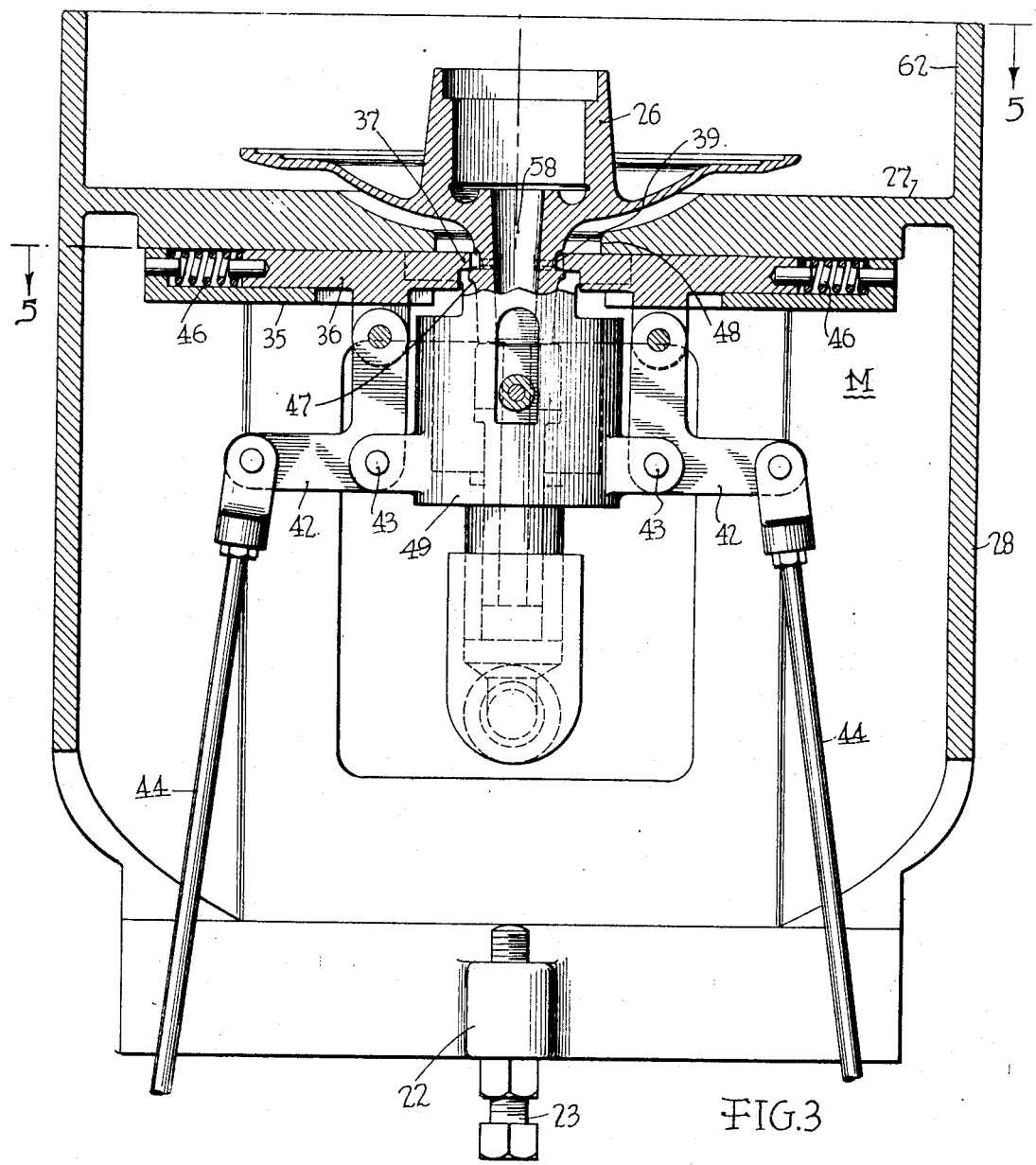
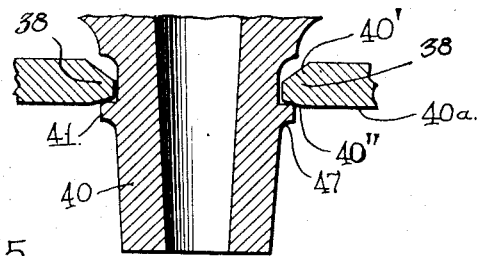
FIG.15
FIG.3
INVENTOR.
HOWARD E. SOMES
BY
ATTORNEY.

INVENTOR.
HOWARD E. SOMES
BY John P. Tarbox
ATTORNEY.

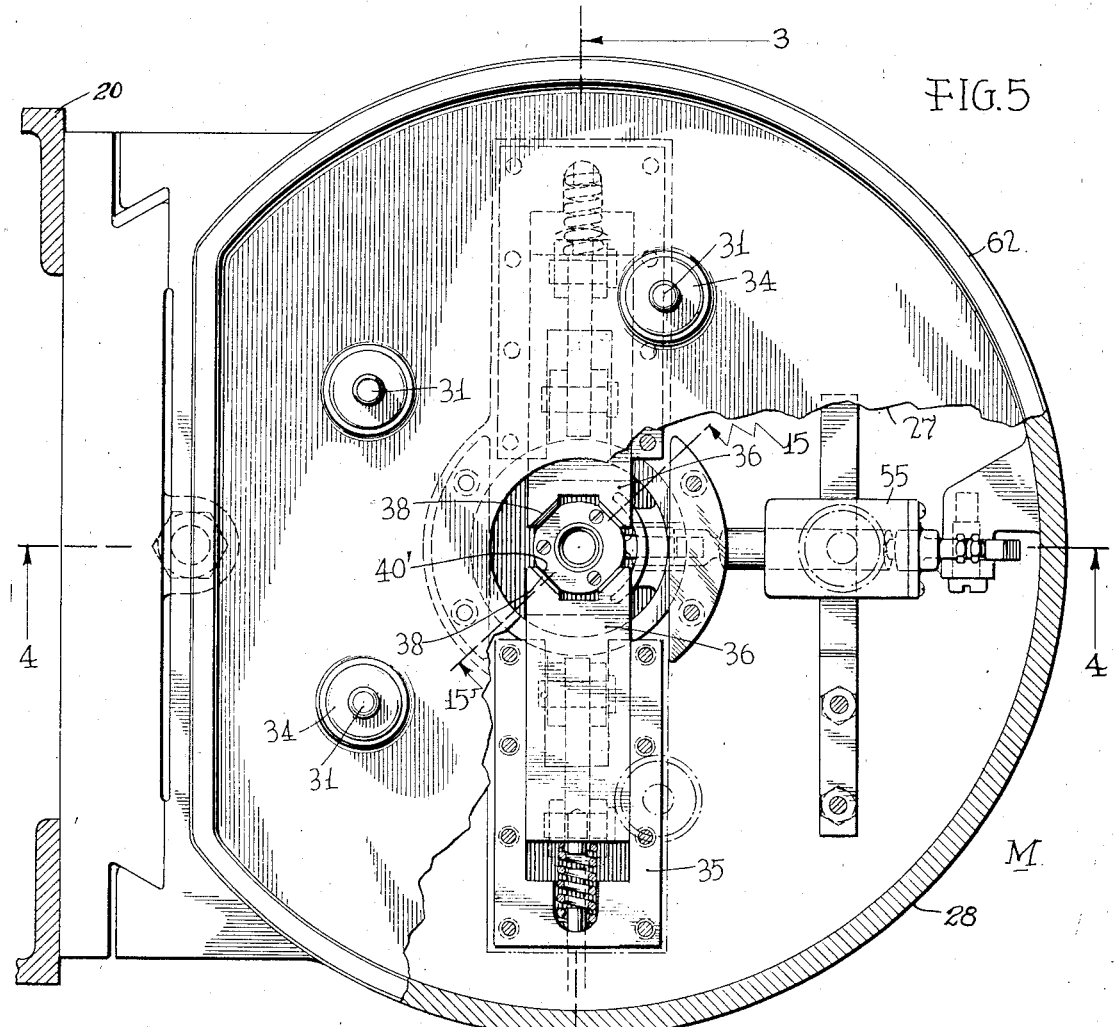
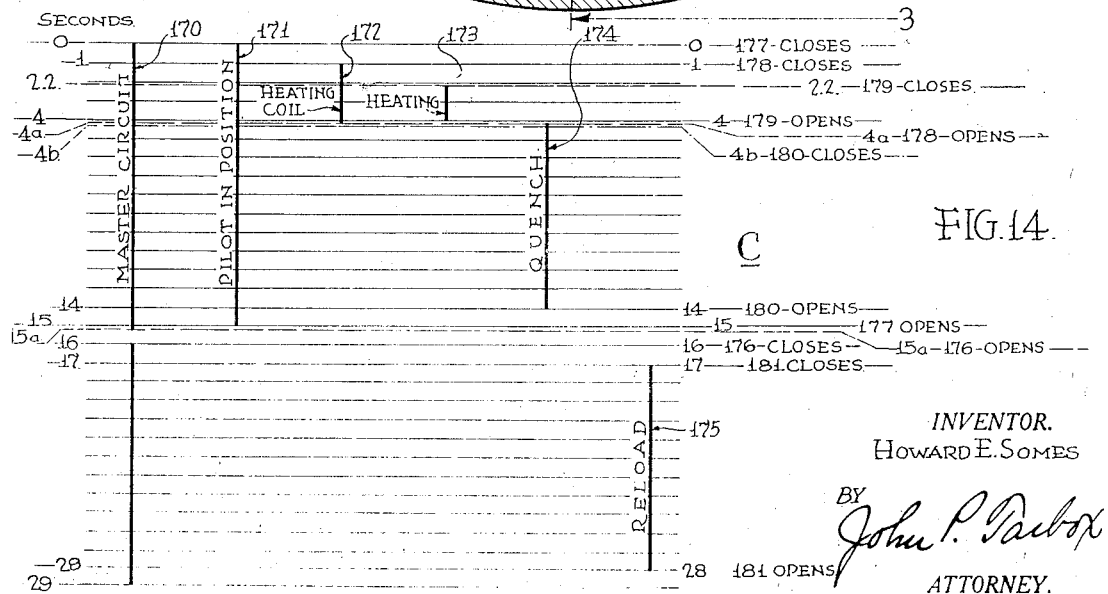

April 28, 1942.  H. E. SOMES  2,281,297
INDUCTION HEAT TREATING APPARATUS
Filed Aug. 17, 1936   10 Sheets-Sheet 5

INVENTOR.
Howard E. Somes
BY John P. Tarbox
ATTORNEY.

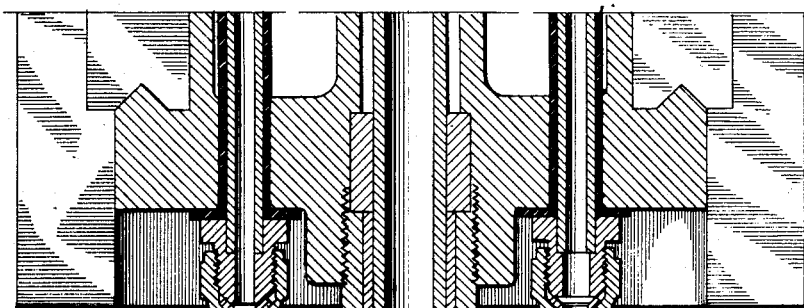

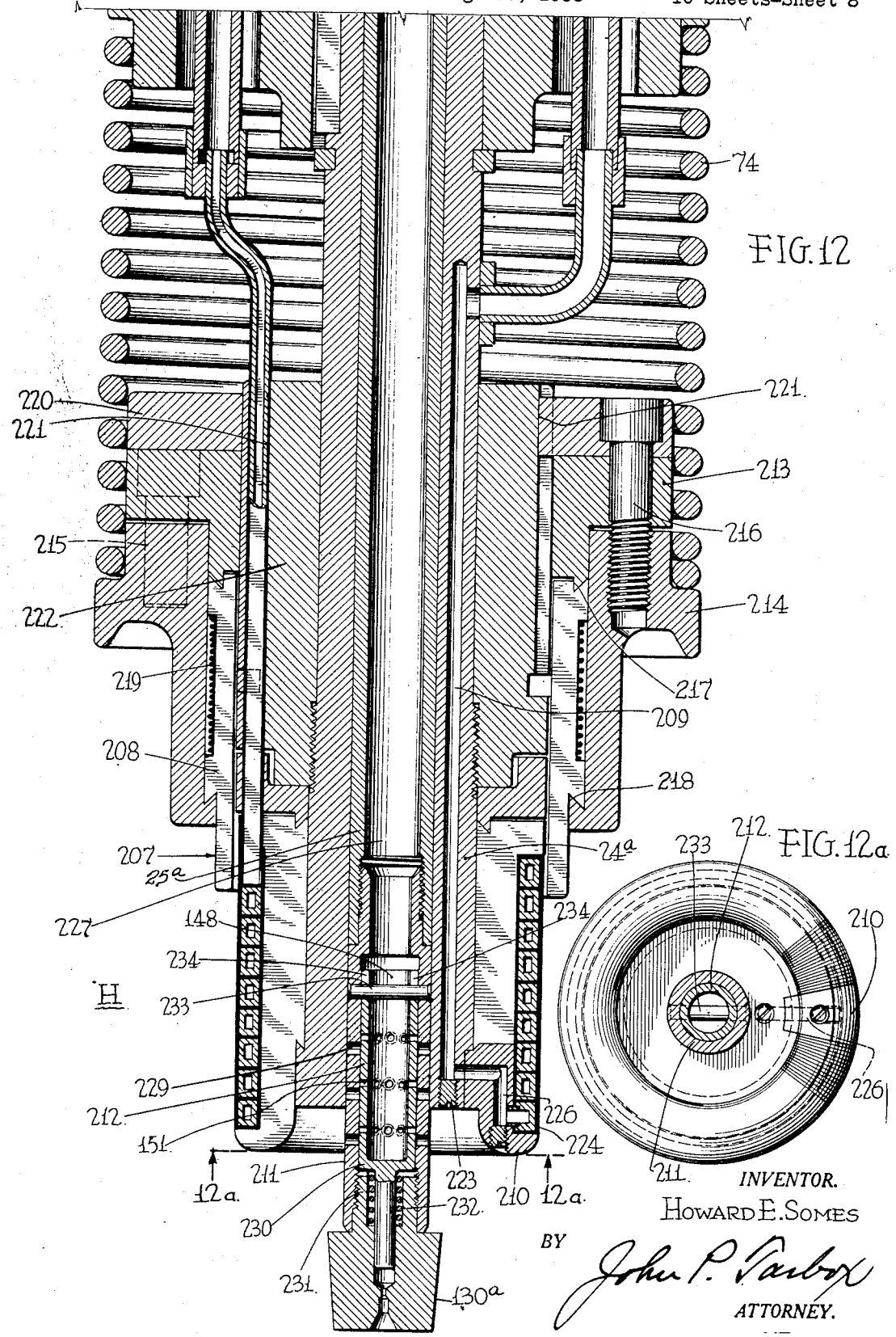

Patented Apr. 28, 1942

2,281,297

UNITED STATES PATENT OFFICE 2,281,297

INDUCTION HEAT TREATING APPARATUS

Howard E. Somes, Detroit, Mich., assignor to Budd Induction Heating, Inc., Philadelphia, Pa., a corporation of Michigan Application August 17, 1936, Serial No. 96,346

25 Claims. (Cl. 266—4)

This invention is a machine for automatically carrying out heat treatment of metallic products. It is peculiarly adapted for carrying out such heat treatments as are effected through the application of heat by the principle of electro-magnetic induction as compared with the application of heat through principles of conduction. Heat applied by conduction is commonly generated through some sort of high intensity flame or arc, whereas heating by the electro-magnetic induction method is through an electro-transformer reaction in which the article worked upon constitutes the whole or a part of the secondary or other element of a transformer, or otherwise is electro-magnetically affected to produce heat within its body. However, while particularly directed to a machine for heat treating through electro-magnetic induction, there are certain aims of my invention which will doubtless reach to improvement in the art of heat treating by methods of conduction and perhaps yet others.

This is so with that outstanding object of my invention which provides an efficient, accurately correlated servo-motor operation respectively of a heating unit and a quenching unit into and out of functional relation to the work piece being operated upon. It is so with that aim of my invention which has to do with an effective clamping and centering means for the work piece and efficient alignment therewith of the heating and quenching tools. It is so with the general arrangement of elements of the machine looking toward efficient and economical handling of the work. It is so with that aim having to do with automatic coordinated control of operations of the machine.

On the other hand, the construction of the electro-magnetic induction heating tool per se and its appertenances, and the arrangements for improving the efficiency of its electric and magnetic circuits, and the cooling of these elements, all evolve with a view to improving the efficiency of this particular process of heating and have outstandingly to do with this process. On the other hand, also, the aim to produce improved means for cutting the electric power on and off and to coordinate it with the electromagnetic induction tool for heating, has its especial application to the electro-magnetically inductive process. Similarly, the aims to closely associate all those devices which operate in close timed relation to each other and simplify and compact and render more efficient the electrical mechanism, have principal application to such a process. Yet it will be obvious to those skilled in the art, that even these electrical aims of my invention may have application to heating through conduction, radiation, and convection processes where the heating unit applied to the work piece is electrical in character.

In achieving the machine of my invention, I have found it convenient to organize it in the following closely coordinated and correlated units of mechanism. First there is the means for mounting, centering, clamping and aligning, the work piece which I have designated the work piece mounting mechanism. Second, there is the heating unit comprehending the heating element per se and its immediate adjuncts which co-acts in the heating of the work piece. Third, is the switching unit through which power is cut on and cut off the heating unit. Fourth, is the quenching unit through which the quenching medium is applied to and removed from the work piece and fifth, the control unit through which operations of all the foregoing units are primarily controlled and timed with respect to each other. These several unit mechanisms of the machine are combined and interknit with each other in a manner to generally simplify the machine and improve its operative efficiency, but more than that, are interactively related each to one or more others in such a manner as to combinedly effect carrying out the operations upon the work piece and combinedly support and aid each other in their respective individual mountings and movements.

The mounting mechanism of my invention, as here disclosed, is in the form of a table having centering and clamping means adapted to support the work piece vertically and in a manner to receive the heating and quenching units vertically. The heating, quenching and switching units with their accompanying motor mechanisms are arranged upon the same axis generally in tandem relation, with the result that the machine operations are yet more closely coordinated than they might otherwise be, and a minimum of floor space is occupied. Preferably the heating, quenching and switching units and their accompanying motor mechanisms are arranged vertically above the work mounting mechanism, and the heating and quenching mechanisms are arranged to be projected downwardly into functional relation with the work piece, whereby the work piece mounting mechanism is at tableworking height for convenience of the operator, and the other mechanisms are in elevated positions where they are the freer from dirt accumulations and can be the more easily inspected and adjusted.

In the accompanying drawings, I have shown the best embodiment of my invention now known to me. As already indicated, the invention is susceptible to many other embodiments.

Of these drawings, Figs. 1 and 2 are general over-all side elevation and front elevation of the machine.

Figs. 3, 4 and 5 are views of the work piece mounting mechanism, respectively, Figs. 3 and 4 vertical cross sections on lines 3—3 and 4—4 of Fig. 5, and Fig. 5 a top plan view looking in the direction of the arrows 5—5 on Figs. 3 and 4.

Fig. 8 is an enlarged section on the line 8—8 of Fig. 7.

Fig. 9 is an enlarged vertical cross section of the work piece, and the quenching and heating units showing certain details of inter-relation thereto peculiarly the relative axial mountings and the flow of the electric power and cooling water to the heating unit, the section through the quenching and heating unit being taken on the line 9—9 of Fig. 8.

Fig. 10 is a view similar to Fig. 9 showing the quenching head alone in the hub and its operative relation thereto.

Fig. 11 is a section on the line 11—11 of Fig. 10.

Fig. 12 is a longitudinal axial section of a modified form of heating coil unit and quenching head.

Fig. 12a is a section on the line 12a—12a of Fig. 12.

Fig. 14 is a time diagram of the cam control system.

Fig. 15 is an enlarged fragmentary section on the line 15—15 of Fig. 5.

Figure 4:
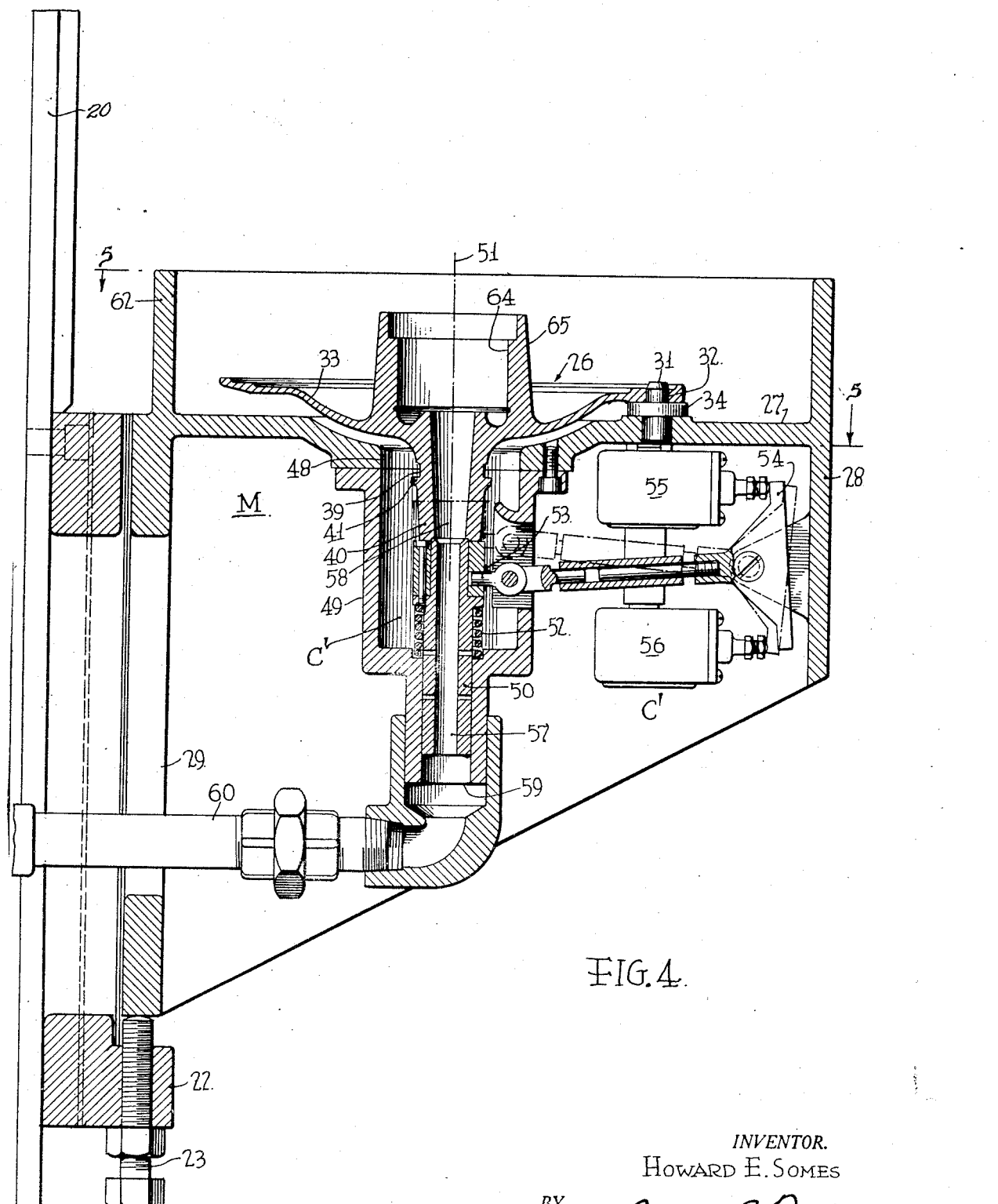

The several component mechanisms of the machine are all mounted upon a machine frame 20 in the form of a tall column of rectangular form (see Figs. 1 and 2) having an extended base 21. The work piece mounting mechanism, generally designated M, the heating unit mechanism generally designated H, the transformer power switching mechanism generally designated T and the quenching unit generally designated Q, together with their immediate appertenances and motor operating mechanisms, are mounted upon the front face of column 20 being supported therefrom by suitable removable and adjustable brackets as clearly appears, the brackets being connected to the face of the column by appropriate bolt and nut connections and in the instance of the mounting mecchanism provided with a vertical sliding and screw adjustment 22—23. The servo-motor for raising and lowering the heating unit is designated $H^1$ and is mounted vertically next above the transformer switching unit T and connected therewith and with the heating unit H by means of a hollow piston rod 24. The motor for operating by means of a second piston rod 25 the quenching unit Q is located vertically next above the motor $H^1$ and is designated $Q^1$.

Interiorly of the column 20 from bottom to top are arranged respectively an accumulative system $Q^2$ for the supply of cooling medium to the quenching unit Q, capacitance $T^2$ which is a part of the switching unit T, and the control unit C for the machine as a whole.

The work piece being operated upon in the illustrated form of my invention is a hub 26 of an automobile wheel. The mounting mechanism M is especially adapted to it. Mechanism M comprises a horizontal table 27 supported by an under annular bracket 28, the vertical branch 29 of which is slidably mounted upon the face of column 20 by means of vertical ways of the order of those found upon the tables and heads of machine tools. Vertical adjustment is provided as heretofore indicated, in the form of a screw 23 which engages the under side of the vertical branch 29 of the angle bracket 28.

The hub is received upon vertically extending centering studs 31 which engage in bolt holes 32 in the wheel or brake drum or mounting flange 33 of the hub, the holes being accurately drilled for the centering operation and the under side of flange 33 being properly faced to afford to the hub true vertical alignment of its axis when it rests upon the skirts 34 of the studs 31 carried by table 27. Of course, other means of centering may be provided, but these are among those commonly used in connection with automobile hubs and wheels.

Beneath the table 27 are carried in horizontally arranged radially extending ways 35, a pair of diametrically opposed sliding jaw clamps 36, the inner ends 37 of which are each provided with a nose 38 adapted to embrace the small end 40 of the hub in the region of the annular recess 39 when the noses are in action. The jaws 38 of the clamps 36 are beveled as at 40' and 40'' on both top and bottom, and the bevel 40'' in the bottom in particular is adapted to ride up over the annular rib 41 provided on the barrel 40, thereby to exert a downward pressure to draw the hub down upon the skirts 34 of the studs 31 and clamp it in place. The angle of the bevel 40'' is such as to make the clamp self-locking against upward pull on the hub. If desired, when all the way home the flats 40a of the jaws may engage over the rib 41. The clamps 36 are operated by connected bell cranks 42 fulcrummed at 43 upon a box shaped member 49 of the table 27 and having their free arms connected by links 44, with a treadle 45 by means of which they are pulled out of clamping position, and by which they may be pulled out of clamping engagement. The clamps 36 are spring pressed into clamping engagement by springs 46 mounted in the slides 35 and bearing against their outer ends. It is in connection with these springs that the upper bevel 40' of noses 38 comes into play. When the hub is placed over the studs 31 of the table 27 and pressed downwardly, the upper bevels 40' of the jaws, which normally lie inwardly toward the work, engage the lower incline 47 of the ribs 41 pressing the clamps 36 radially outwardly until they snap past the projecting rib 41, and the lower bevels 40'' engage over the tops thereof to effect the clamping action described.

It will have been observed that the table 2 is provided with a central aperture 48 through which the small barrel 40 of the hub is projected in this mounting operation. Depending from the sides of the opening 48 is an axially aligned boxlike structure 49 which mounts the mechanism $C^1$ which is a part of the control mechanism C. The mechanism $C^1$ is a guard device which through the control mechanism prevents the machine from operating twice upon the same piece of work or when there is no work piece on the table 27. It consists of a plunger 50 mounted in the box 49 upon the axis 51 of the machine which is also, it will now be observed, the axis of the work piece 26. This plunger is normally drawn vertically upwardly by means of a spring 52. Its upper end, when the work piece 26 is in place, is engaged by the lower end of the small barrel 40 and the plunger 50 is thereby depressed from its upper position, shown in dotted lines, to its lower position, shown in full lines. When so depressed, it operates through a radially projecting stud 53 having an articulated connection with bell crank 54, two switches 55 and 56 of the control mechanism C'. These switches are fixedly mounted on a wall of the angle bracket 28 beneath the table 27. When the plunger 50 is up and there is no work in the machine, the lower switch 56 is closed, the parts being in the dotted line position. When there is a work piece 26 in the machine, then the upper switch 55 is closed as shown in full lines. The time relations of closing and opening these switches will be described later in connection with the operation of the control mechanism.

The plunger 50 is hollow as indicated at 57. This hollow communicates at its upper end with the hollow 58 of the work piece. It is designed to receive and conduct from the work piece quenching fluid which has been applied through the quenching unit Q. At its lower end it communicates through the aperture 59 in the lower end of the housing 49 with a conduit 60 which returns the quenching fluid to tank 61 of the accumulator $Q^2$ of the quenching mechanism Q.

The form of this mounting mechanism M will, of course, be varied extensively in accordance with the nature of the work piece being treated. While we have shown an automobile wheel hub as the work piece, in the case of an engine cylinder, the form of the mounting mechanism might be materially changed. Yet such changes would very likely embody a number of the generic features of the instant embodiment. It would doubtlessly embody the raised wall 62 of the table 27 to prevent splashing of the quenching medium about the machine. It would assuredly involve centering and clamping devices; it would assuredly involve the components $C^1$ of the control mechanism C; it would involve appropriate drainage mechanisms for the quenching medium from the unit Q.

The heating unit H is comprised of a heating coil 63 and appertenant parts. The construction in general is that described and claimed in my copending application Serial No. 50,829, filed November 21, 1935, now Patent No. 2,256,873, issued Sept. 23, 1941, and need not therefore be described in greatest detail here except in the matter of the improvements disclosed herein. In general, the coil 63 is of a diameter and length adapting it to be projected within the hollow of the large barrel 65 of the hub and in close juxtaposition to the surface 64 which surface is the surface to be heat treated. The surface 64 is machined to serve as a bearing race for the hub. It is to be heat treated to serve as such race as effectively as a hardened ball race. High frequency alternating current is to be supplied the heating coil 63 to heat treat surface 64 to harden it to a desired depth. This depth is usually but a small fraction of the total wall thickness of the hub barrel 65.

The coil 63 is carried upon a spool shaped hollow inner laminated core 66 of magnetic material. The laminations are mounted by dovetail connection upon a hollow arbor 67 of non-magnetic material. This arbor is really a part of the hollow piston rod 24 to the heating unit from servo-motor $H^1$ and lies upon the axis 51 of the machine. The ends of the laminations of the core 66 project axially beyond the ends of the supporting arbor and radially outwardly whereby jointly to retain the coil 63 thereon in place, and to assist in completing the magnetic circuit through the work piece as will be hereinafter apparent. The coil receives its energy through conductors 68—69 from the transformer switching unit T. The conductors 68—69 and the coil 63 are hollow whereby to receive cooling fluid to keep the heating unit H cool in spite of the passage therethrough of immense quantities of power and the extreme heat developed in the work piece 26 while it is juxtaposed thereto.

Figure 6:
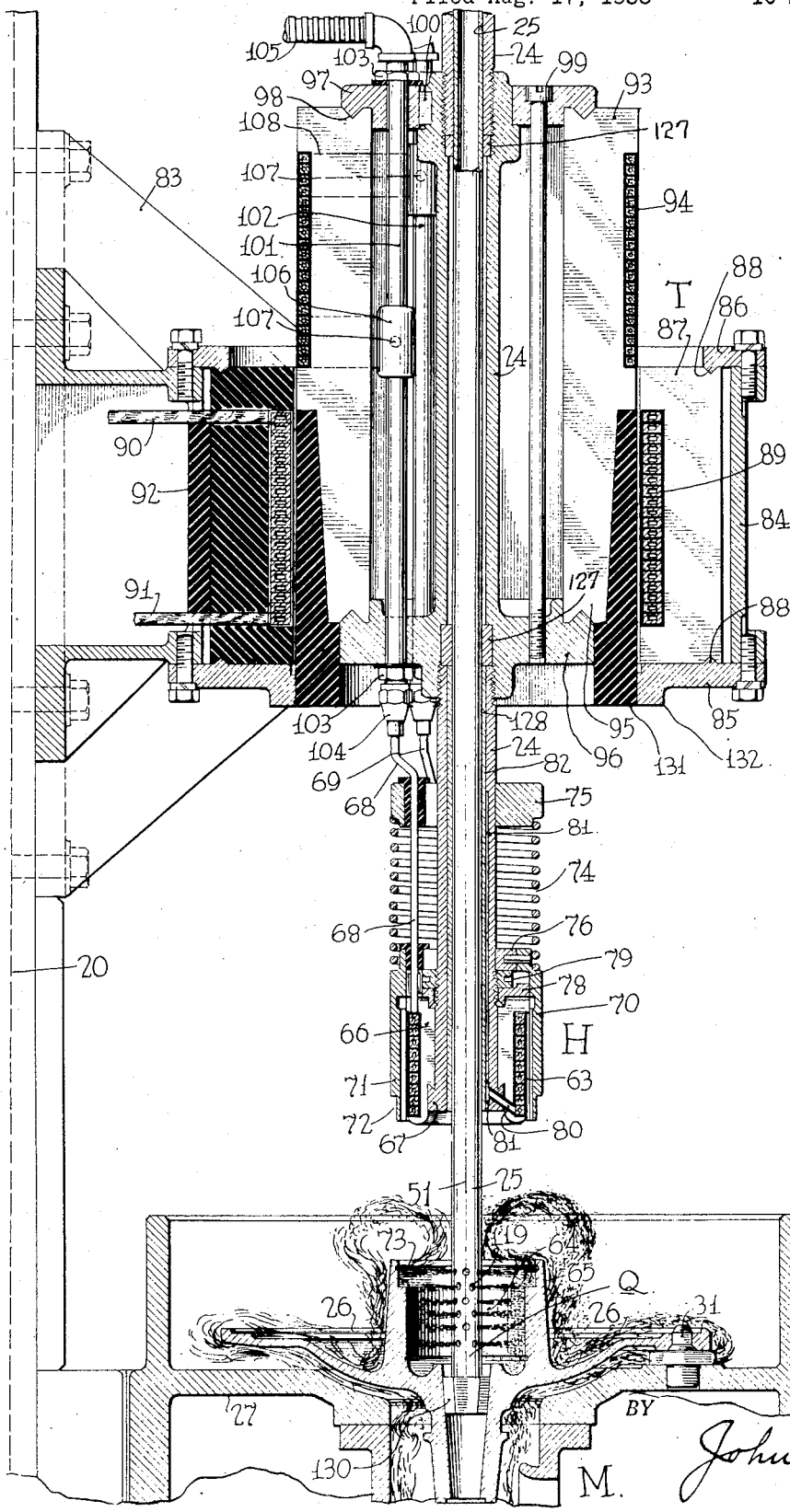
Figs. 6 and 7 are respectively vertical cross sections of the heating, quenching and switching units, Fig. 6 showing the quenching unit in engagement with the work piece while the heating unit is out of engagement therewith, and Fig. 7 showing the heating unit in engagement with the work piece, the switching unit having appropriately coordinated relation in each case.
Figure 7:
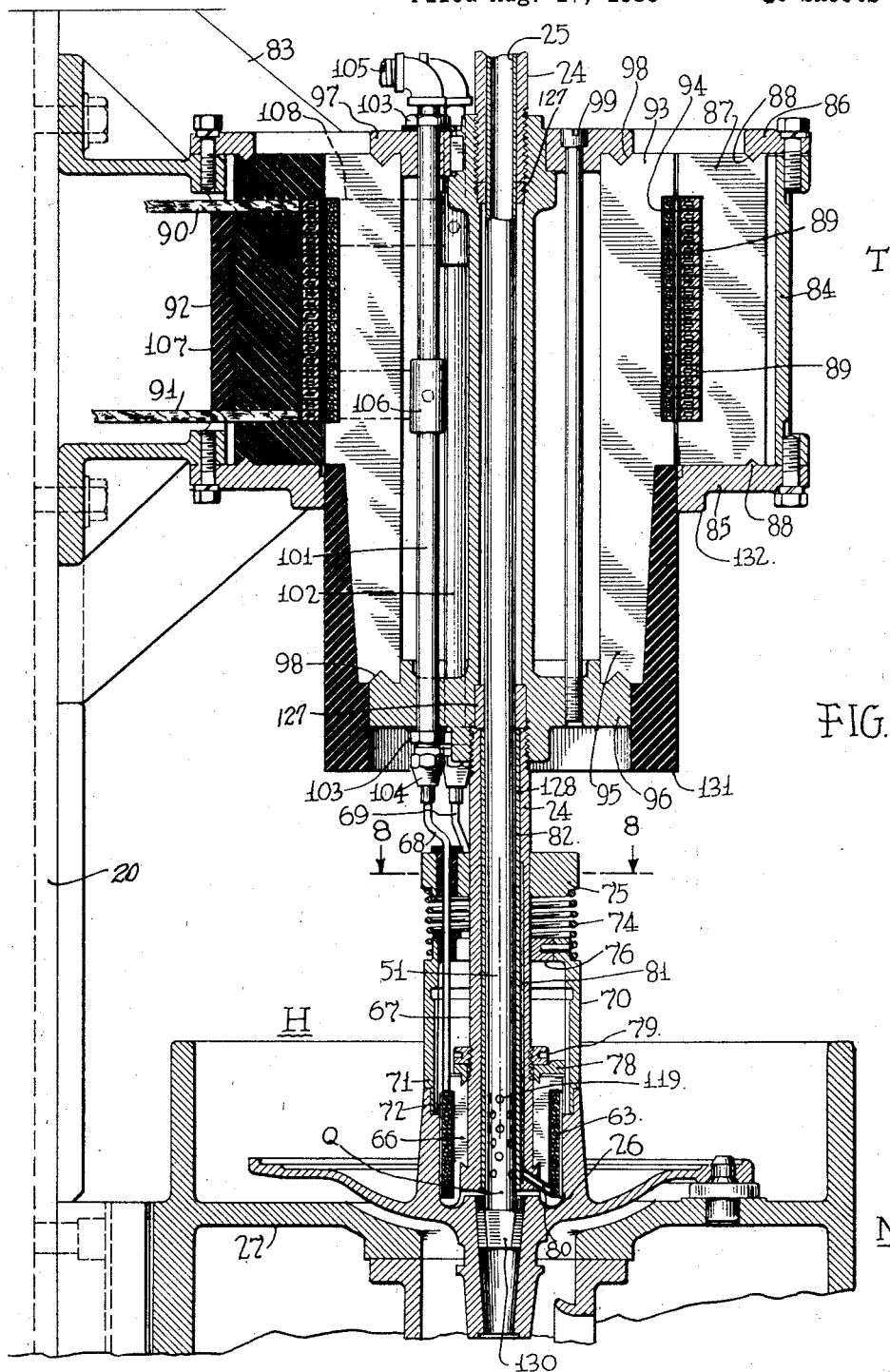

Co-acting with the core 66 of the heating unit H is an axially deep ring 70 of magnetic material co-axially mounted. This ring 70, as shown in Figs. 6 and 7, is solid and radially slotted partly through from the inner surface. I propose also, as in the modification shown in Fig. 12, to make it of laminations. All-important is the fact that its lower end 71 is provided with a recessed portion 72 complemental to the recessed portion 73 of the upper or outer end of the hub barrel 65 whereby when the heating unit H is lowered into functional relation with the work piece 26, the lower end 71 of the ring 70 engages the upper end of the hub barrel 65 with the recessed portions 72—73 in complemental engagement, and the lower end 71 in close juxtaposition with the upper end of the inner hollow core 66, whereby the magnetic flux passes from the upper ends of the laminations of core 66 into the lower ends 71 of the ring 70 and therethrough to the complemental portions 72—73 into the body of the hub barrel 65. Air gaps which might otherwise very much increase the reluctance of the magnetic circuit are thereby minimized.

The ring 70 is axially long, generally for the purpose of affording a protecting sheathing for the heating coil 63 when the heating unit H is in the raised position shown in Fig. 6, for the purpose of providing a magnetic sheathing which progressively as the work coil 63 moves upwardly from the work piece 26, takes the magnetic place of the barrel 65 of the hub and thereby minimizes changes in power factor relations in the work circuit, and thirdly for the purpose of affording an effective operating connection of itself with the operating mechanism for the work coil 63.

This operating connection is a spring connection 74 between the upper end of the ring 70 and a flange ring 75 fixedly mounted on the piston rod 24 a distance vertically above coil 63. The upper end of ring 70 is slidably mounted upon the hollow piston rod 24 by means of the inwardly projecting flange or ring connection 76 shown in the form of a separate ring having a pin connection with the upper end of the ring 70. An inner and supplemental sliding guide and bearing 78 is provided in the form of a ring clamped in fixed relation to the arbor 67 by means of a threaded clamping ring 79. Thereby as the work coil 63 is moved into functional relation with the work piece 26, the supplemental magnetic ring 70 engages the outer end of the hub and is stopped thereby, and as further movement of the coil 63 toward its final position with respect to the work piece takes place, the piston rod 24 slides through the upper bearing 76 of the ring 70 and the guide ring 78 slides along its interior, the spring 74 being progressively compressed to firmly hold the supplemental ring 70 in position upon the end of the hub barrel.

The conductor 68, supplying the coil 63, is passed through the fixed ring 75 of the piston rod 24 and slidably vertically through the relatively movable mounting flange 76 of the ring 70 to reach the upper end of the coil 63. Cooling water traversing the coil 63 emerges from the lower end of the coil by way of an angular duct 80 through the lower end of the arbor 67 to find its way into an axially upwardly extending channel 81 formed by a recess in the inner surface 82 of the hollow piston rod 24. This hollow 81 extends as far as the fixed mounting flange 75 where, as shown in detail in Fig. 9, it enters a bore 82' formed in the ring 75 and from this bore finds its way to the hollow of conductor 69 and thence back to the source of water supply. This channel 80, 81, 82' connecting with conductor 69 constitutes also through its several parts and the walls thereof, the return current conductor for the coil 63.

The switching mechanism T next above the heating unit H in axial alignment is a transformer switching device. This also is described in my copending application Serial No. 96,929, filed August 17, 1936, and claimed therein and needs but a general description here, over and above those novelties and its combinations with the heating and quenching units H and Q. The mounting of this unit T on the face of a column 20 is by means of an outstanding bolted-on bracket 83. This bracket is of non-magnetic material and embodies the cylindrical casing 84 of the transformer switching unit T. This cylindrical casing is provided with upper and lower clamping heads or rings 85, 86 which retain in place the laminated magnetic core 87 of the primary element of the transformer unit. These laminations are retained in place through annular ribs 88 which enter complemental notches in the laminations of the core 87. The primary winding of this element is designated 89 and is comprised of a suitable number of turns of hollow water cooled conductors as indicated, the leads of which 90 and 91 are brought out to connect with the primary supply circuit. These leads are brought out through spaced radial laminations and intervening blocks of insulated material 92.

The secondary element of this transformer switching unit is comprised of a laminated magnetic core 93 and accompanying secondary coil 94 together with an appendant core extension 95. The core laminations in this case are retained in cylindrical radial order by means of upper and lower clamping rings or heads 96 and 97 which engage the laminations by a system of annular ribs and complemental recesses designated 98 and essentially similar to those 88 in connection with the primary element. The annular ring 96 is really in the form of a shoulder or flange upon the hollow piston rod 24, which, at its bottom end through the arbor or shank portion 67 supports the heating unit H. This piston rod 24 as is now apparent is made in a number of sections screw-threaded or otherwise connected together in through axial alignment. It is upon the center of these sections of piston rod 24 that the secondary elements of the transformer switching device are mounted as described, and the ring 96 is in the form of an integral shoulder extending from the lower end of this center section. Ring 97 is in the form of a ring or flange centered about the upper end of the central section of piston rod 24 and clamped in position by throughrunning clamping bolts 99 which extend through the hollow of the magnetic core 93 between that core and the piston rod 24 and have a threaded engagement with the lower clamping ring 96. Ring 97 has a key and slot connection 100 which preserves its angular position with respect to the lower ring 96 whereby the bolts and the conductor connections shortly to be described are maintained in axial parallelism. The extension 95 is in the embodiment shown an integral extension from the laminations of the main body of the core juxtaposed to the secondary coil 94, and is provided with a downwardly divergent air gap between it and the primary coil 89 when in raised position as shown in Figure 6.

The work circuit connections between the secondary or working coil of the transformer switching device T and the coil 63 of the heating unit are effected through the hollow of the core 93. Insulation sheathed tubular conductors 101 and 102 are projected through apertures in axial alignment through the two clamping rings 96 and 97 and insulated therefrom. They are retained firmly in position by threaded-on nuts 103, and suitably insulated from the clamping rings. At their lower ends they are connected by union adaptors. One of these adaptors 104 is of a type changing from the rectangular cross section of the conductor 68 constituting the upper terminal of coil 63 to the circular cross section of the conductor 101. The other is a circular adaptor, since the winding of coil 63 is not integrally extended to the head 75 but communicates therewith through the channel 81. At their upper ends the tubular conductors 101, 102 are connected through flexible insulating leads 105 with a source of cooling water supply, which, during operation of the machine, is constantly circulated through the heating coil of unit H. Intermediate their upper and lower ends conductors 101, 102 are connected by manifolds 106 which break into the insulated coverings of these conductors and communicate by apertures 107 with the water conveying interior thereof, in multiple with a number of turns of the secondary coil 94, in the instance shown four coils, as indicated by the dotted line through-running connections 108. Secondary 94 is wound in four turns in multiple and therefore consists in its twenty convolutions of but five effective turns or thereabouts. Through these multiple connections 108, not only do the convolutions of coil 94 receive water for cooling purposes, but also through them coil 94 delivers its energy to the work circuit in which it is included, the work circuit comprehending in its lower end the work coil 63.

The uppermost section of piston rod 24 as clearly appears in Figure 2 connects with the piston 109 (shown in dotted lines) of the reciprocating compressed air servo-motor 110 constituting the element H¹ of the heating unit H. This motor is secured to the face of column 20 through an extension 111 from the face of the column since its dimensions are small. It is a double acting motor operating through compressed air received at opposite ends of the cylinder through valve conduits 112 communicating with a piston valve 113 operated electro-pneumatically through the magnet 114. This arrangement of electro-pneumatic valve control being of known construction and arrangement, it suffices to say here that the arrangement is such that when the valve magnet 114 is deenergized the valve is held in off position in which air is admitted beneath the piston 109 to raise the same, but when the magnet valve 114 is energized the valve moves to on position in which air is admitted above the piston 109. In one case the servo-motor unit H¹ of the heating mechanism operates through piston rod 24 to raise the secondary element of the transformer switching unit T together with the appendant heating unit H including its coil 63 to the position shown in Figure 6. In the other case the magnetic valve 114 being energized operates to lower the same units to the working positions shown in Fig. 7, in which the primary and secondary coils 89 and 94 of the transformer switching unit are in working juxtaposition and the coil 63 of the heating unit and the supplemental magnet ring 70 are in working juxtaposition to the work piece 26.

Next above the servo-motor H¹ of the heating unit H is the servo-motor Q¹ of the quenching unit Q. This servo-motor is constructed and arranged and operated in a manner essentially similar to servo-motor H¹ of the heating unit H. It would suffice, therefore, to designate its piston 115, its cylinder 116, its piston valve 117, and its operating electro-magnet 118. In an operation entirely similar to that described in connection with servo-motor H¹, in the normal spring pressed off-position of valve 117, piston 115 is raised in cylinder 116, and when moved downwardly in response to a movement of valve 117 to on-position, operates through piston rod 25 which extends axially through the hollow piston rod 24 of servo-motor H¹, and through those extensions thereof which traverse the transformer switching mechanism T and the heating mechanism H, to project the spray head 119 of the quenching unit Q into working juxtaposition with the barrel 65 of the work piece 26. This spray head consists of an extension having threaded engagement 120 with the lower end of the piston rod 25 and provided with a large number of spray apertures 121 adapted to direct quenching fluid substantially radially in a number of different directions upon the surface 64 to be treated. The piston rod 25 and its downward extensions are tubular and communicate at the upper end beyond the servo-motor Q¹ through a flexible connection 122 with the accumulator mechanism Q² in the base of the column 20 as indicated by the dotted line 123.

The piston rod 25 passes through stuffing boxes 124 at opposite ends of the servo-motor Q¹ of the quenching unit Q, through stuffing box connection 125 at the upper end of servo-motor H¹ of the heating unit mechanism H, through stuffing box 126 on the upper side of the piston 109 of servo-motor H¹, and thence downwardly through lubricated sliding connections 127 with the transformer switching unit mechanism T, and ultimately through a lubricated lining tube 128 in that lowermost section of the operating piston rod 24 of the heating mechanism H to emerge in the spray head 119 just now described.

This piston rod 25 of the quenching unit carries at the lower end of its spray head 119 a tapered centering and aligning fixture or head 130 of a conical shape adapting it to engage and be centered by the conical inner surfaces 129 of the small barrel 40 of the work piece. So centered and aligned and fixed on the axis of the machine, the piston rod 25 serves as a central guide for the elements of the heating mechanism H and those of the switching mechanism T which slides up and down under the action of servo-motor H¹. However, it is not the only guiding and centering means for these elements inasmuch as within the transformer switching mechanism T the core extension 95 engages through its exterior periphery, in this instance constituted by the insulating sleeve 131, the axially flanged cylindrical bore 132 of the clamping head 85 thereby centering and aligning the axial movement of the secondary switching element of the mechanism. Furthermore, the upper section of the piston rod 24 is in its turn passed through the aligning stuffing box 133 of the servo-motor cylinder H¹, holding in position in axial alignment the upper end of the secondary element. Indeed the secondary element of the transfer switching mechanism T and the coil elements of the heating unit H are rigidly connected together through the hollow piston rod 24 in close coupled electrical connection with each other and in accurate alignment through this rigid tandem mounting and the axial guiding means just now described.

The accumulator device Q² of the quenching mechanism Q as located in the lower part of column 20 consists of a tank 61 previously mentioned in connection with the discharge from the quenching unit Q contained in the mounting mechanism M, which tank receives discharge quenching medium such as oil, water or other, and stores it for use. This tank is provided with a cooling coil 134 having suitable connection 135 with a source of cooling fluid as, for example, water from the water mains. Alongside of the tank is an accumulator cylinder 136, the piston 137 of which is biased to a downward position by a great weight 138 on the upper and outer end of piston rod 139. Oil is admitted to the cylinder from the tank 61 through check valve 199 and filter 200 and discharged from the cylinder through check valve 201 and discharge pipe 202. The charge of oil is drawn in by downward movement of the piston 137 under the force of the weight 138 and discharged by upward movement of the piston under force of compressed air admitted to the bottom of the cylinder under the piston through a valve 203 from a compressed air supply pipe 204, valve 203 being biased in closed position and arranged to be opened upon energization of valve actuating magnet 197.

The accumulator 136 being so charged and its pressure sustained by the accumulator weights 138, that quenching fluid is admitted through connection 123 at the proper time in the operation of the machine through electro-magnetic valve 203. When the quenching fluid is so admitted to the hollow piston rod 25 it passes down to the spray head Q where it is discharged as a spray to the work piece. Where the modified form of spray head shown in Figure 12 is used, the spray apertures remain open only during the quenching by reason of relative movement between inner and outer sleeves 212, 211 of the spray head. These sleeves are axially relatively movable, the inner sleeve 212 being closed at its lower end as clearly appears, and having the hollow interior opening through its upper end 148. Sleeve 212 is biased upwardly by spring 232, retained in position against its lower end by the threaded-in centering and aligning head 130a corresponding to that previously described at 130. It is held against axial rotation by a pin and slot connection 233, 234. Normally when quenching fluid pressure is removed from rod 25a of the quenching unit through the atmospheric venting action of the electro-pneumatic valve 203, the inner sleeve 212 occupies the raised position as shown in Figure 12, but when the pressure is applied through valve 203 and from the accumulator 136, sleeve 212 is moved downwardly against the pressure of spring 232 to bring the inner sleeve apertures 151 corresponding in number and angular relation to the apertures 229 of the outer sleeve 211 into register with the said apertures 229, permitting the quenching spray to be directed upon the surface 64 to be quenched. The spray continues at the predetermined pressure of the accumulator 136 and until the predetermined volume of the accumulator 136 is exhausted, thereby insuring the regulated quantity and pressure of quenching medium.

Figure 13:
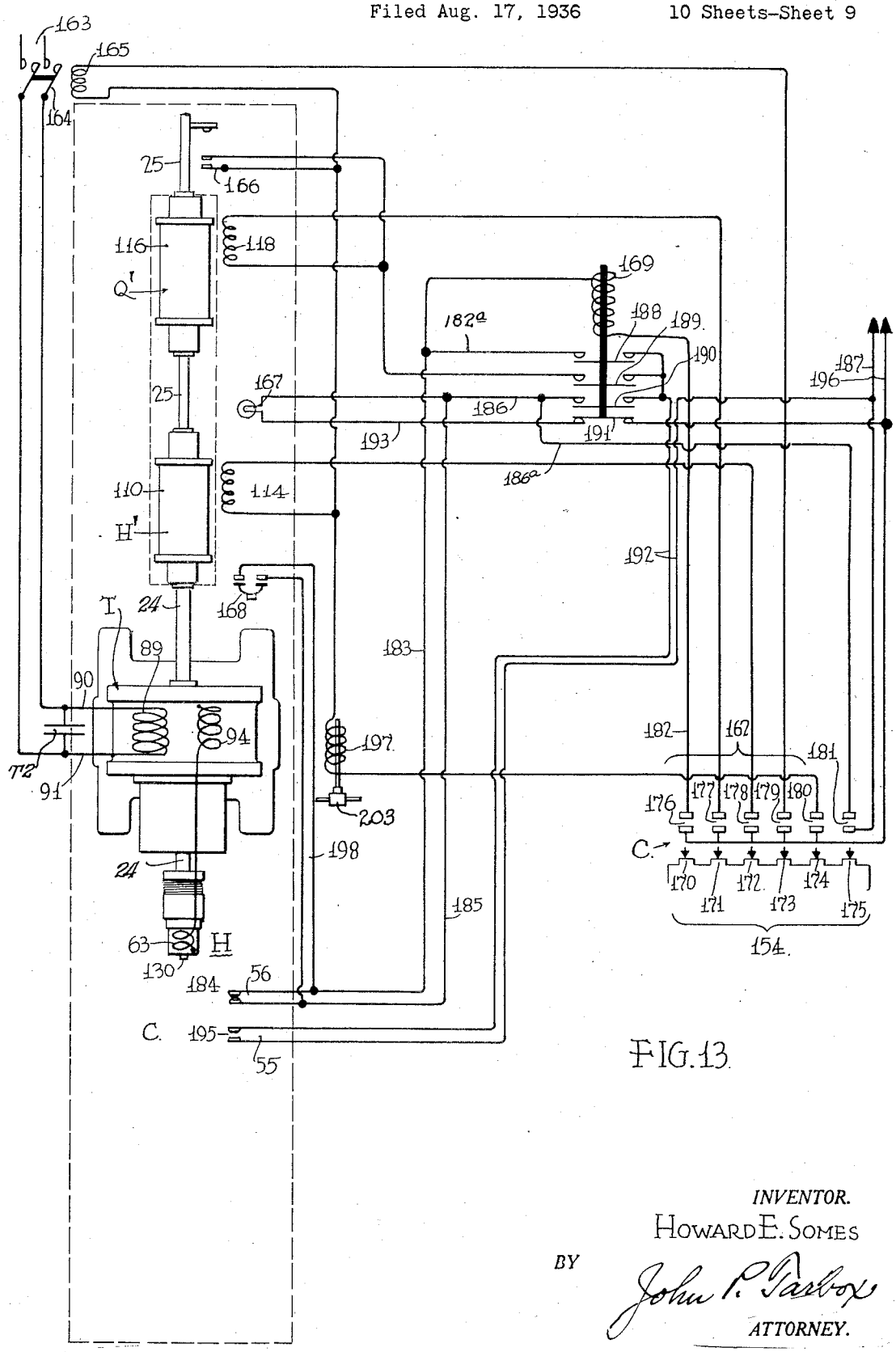
Fig. 13 is a diagram of the electrical connections appertaining to the control unit for the whole.

The capacitance T2 located in the column 28 opposite the transformer switching unit T may be connected across the primary leads 90, 91 as indicated in circuit diagram Figure 13, or across the conductors 101, 102 of the work circuit. Under some instances is used one connection and under other instances is used another. The capacitance T2 is located as shown in the column so as to be in close coupled relation to either the primary or the secondary of the switching unit T. A shelf 152 is the mounting means.

The control mechanism C for the machine in its entirety is mounted similarly on a shelf 153 in the upper end of the column. This control mechanism comprises a series of control cams 154 mounted on a transversely extending cam carrying drum 155 in the upper end of a framework 156, the base 157 of which rests on shelf 153. On the base is mounted also driving motor 158 and reducing gear 159. Connection between the gear 159 and the drum 155 is by means of a gearing 160 whereby the cams 154 make a revolution in a constant and properly adjusted time.

Each one of the cams 154 through one of the cam followers 161 controls one of the switches 176 to 181 inclusive of the group 162. Each of these cams has a definite time relation to each other of the cams and through the timed operation of switches 176 to 181 inclusive controls one or another of the phases of operation of the various unit mechanisms M, H, T and Q in a manner which will now be described with reference to the diagram of connections Figure 13.

In this diagram of control connections, elements already described and now diagramed are provided with reference numerals corresponding to those used in the description. Thus elements of the control mechanism are designated generally C, elements of the heating mechanism are designated H, those of the transformer switching unit are designated T and in reference numerals the cams of the control mechanism are designated 154, the switches operated thereby are designated 162, the switches of the control mechanism C' associated with the mounting mechanism M are designated 55 and 56, the work coil of the heating unit is designated 63, the primary and secondary coils of the switching unit are designated respectively 89 and 94, the servo-motor of the heating unit is designated H¹ and its piston rod 24, the servo-motor of the quenching unit is designated Q¹ and its piston rod 25, the solenoid controlling the servo-motor H¹ is designated 114, and that controlling the servo-motor Q¹ is designated 118. In addition to the devices already described, the diagram discloses high frequency high voltage supply means 163, circuit breaker therefor 164 and its actuating coil 165, limit switch 166 associated with the servo-motor Q¹ of the quenching device and closed only when the spray head 119 of the quenching mechanism Q is in lowermost position, a signal lamp 167 operated to show when the machine may be reloaded, a push button switch 168 for starting the work cycle of the machine, and a locking relay 169 effecting certain locking and other relations between the circuits of the aforementioned devices.

In Fig. 14 there is shown a time diagram of the various cams 154. The cams of group 154 are designated respectively, 170, 171, 172, 173, 174 and 175. On this diagram from top to bottom are designated increasing time increments of a given cycle. The vertical heavy lines represent the extent in time and the timed relation to each other of the several cams 170 to 175 of the group 154. Accordingly, these lines are designated with the numbers of the corresponding cams. The switches of the group 162 are designated 176—181. Similarly the horizontal dotted lines indicating the relative times have legends applied associated with the numbers of the corresponding switches to take the relative open and closed conditions thereof at the respetcive times indicated at the left hand ends of the dotted lines.

The cycle of control operations then is as follows: Let us commence at the bottom of the diagram and notice that the period between the 17th second and 28th second of the cycle is designated the reloading period. During this time it is intended that one work piece 26 shall be removed from the machine and another shall be placed therein. Removal of a work piece closes switch 56 and opens switch 55 of the control mechanism C associated with the work table 27 by mechanism M. It is to be noted here that these switches 55 and 56 are of a type operable upon very slight movement of their operating plungers, having in the present instance a total tolerance in the neighborhood of one one-hundredth of an inch. The closure of contacts of switch 56 closes the circuit of the locking relay 169 from contacts of switch 176 controlled by cam 170, by way of conductor 182, the coil of the relay 169, conductor 183, contacts 184 of switch 56, conductor 185, conductor 186, contacts of switch 181 controlled by cam 175, and to the other side of a supply line 187 of relatively low voltage for operating the various relays and solenoids. Relay 169 pulls up closing its contacts of switch 188, 189 and 190 and opening its lowermost contacts of switch 191. Relay 169 is retained energized if no further action is taken than this unloading action so long only as contacts of switch 181 of cam 175 are closed. These remain closed as indicated only for the time from the 17th second to the 28th second of the cycle as clearly indicated in the diagram. If the loading is not accomplished within this period the relay 169 is deenergized as the cam 175 reaches the 28th second of the cycle and may not again be energized until the same reloading period has been reached on the succeeding cycle, and this irrespective of whether or not in the interim a new work piece 26 has been loaded.

When a new hub is put in place, contacts 184 are opened and contacts 195 of switch 55 are closed, contacts 184 opening before closure of contacts 195 open one branch of energizing circuit of locking relay 169. This relay is locked meanwhile through guarding circuit 192, relay contacts 188 and 190 and conductor 182a. At the end of the 29th second which corresponds to the zero point or beginning of a cycle of operations, the cam switch 177 closes completing the energizing circuit of the pilot servo-motor electro-magnetic control solenoid 118 over a path which may be traced from line wire 196 through cam switch 177, electro-magnetic control solenoid 118, contacts 189 of relay 169, guarding circuit 192, closed through contacts 195, back to the other side of line 187. Energization of the electro-magnetic control solenoid 118 causes air to be admitted to the top of the operating cylinder 116 which moves the piston rod 25 and spray head 119 into operating relation with the work. This also closes switch 166. The next second after this as indicated on the time diagram Fig. 14 cam 172 closes cam switch 178 which effects energization of the electro-magnetic control solenoid 114 of the cylinder 110, the energizing circuit of which may be traced from line wire 196 over cam switch contacts 178, electro-magnetic control solenoid 114, limit switch 166 (now closed because of the movement of piston rod 25 to its lowermost position) and thence through contacts 189 of relay 169 and guarding circuit 192, closed through contacts 195 of switch 55 to the other side of line 187. Energization of electro-magnetic control solenoid 114 admits air to the top of cylinder 110 which effects movement of the heating coil 63 into operative relation with the work piece. 1.2 second after this, the 2.2 second period in the cycle the control cam 173 closes the cam switch 179 which effects energization of the actuating coil 165 of the electro-magnetically controlled power switch 164 over a path which may be traced from line wire 196, cam switch 179, energizing coil 165 of the power switch 164, contacts of limit switch 166, contacts 189 of locking relay 169, and thence through guarding circuit 192 to the other side of line 187. Closure of the power switch 164 closes the high frequency power line 163 onto the terminals of the primary coil 89 of the transformer. The secondary transformer coil 94 having been brought into transformer relation with the primary coil upon the movement of the heating coil 63 into operating relation with the work, the heating coil 63 is supplied with high frequency current of the proper volume to effect the desired heat treatment of the work in the given time determined by the length and the speed of the control cam 173. In the present example, the heating coil 63 is maintained energized for 1.8 seconds or until the end of the 4th second of the cycle as indicated in the time diagram Figure 14, whereupon the cam 173 permits the cam switch 179 to open, which opens the energizing circuit of operating coil 165, opening the power switch 164 and cutting off the power circuit 163 from the transformer primary winding 89. Simultaneously therewith, as indicated on the time diagram as 4a, cam 172 moves from under the cam switch 178 permitting said switch to open, which opening the circuit of the electro-magnetic control valve 114 causes the admission of air to the bottom of cylinder 110 quickly moving the heat coil 63 out of engagement with the work and the secondary winding 94 out of inductive relation with the primary winding 89. It is to be noted that instead of first interrupting the power circuit at the power switch 164 and immediately thereafter or substantially simultaneously therewith effecting disruption of the inductive relation between the primary and secondary coils of the transformer as just described, the power switch 164 may be done away with altogether for timing purposes and used mainly as a general power switch or for emergency purposes, and the switching transformer T relied upon wholly for interrupting the connection between the power circuit and the heating coil. In the latter case, the automatic control of the power switch may remain but be so altered in relation to the cycle of operations (as by lengthening the cam 173 to extend slightly beyond the ends of cam 172) as to close the power circuit onto the terminal of the transformer before the primary 94 is moved into operating position, and to open the power circuit connection after the secondary 94 has moved out of the operative position with the primary coil, the timing diagram for this condition of operation being shown in Fig. 16 to be later described. Now, immediately after the opening of the power circuit and the upward movement of the heating coil and the transformer secondary, and at a point in the cycle indicated as 4b the quench-control cam 174 effects closure of the cam switch 180 which closes the circuit of the quench-control electro-magnetic solenoid 197, the energizing circuit of which may be traced from line 196 through cam switch 180, electro-magnetic valve control solenoid 197, limit switch 166, contacts 189 of locking relay 169, guarding circuit 192, to line 187. Energization of the electro-magnetic quench-control solenoid 197 causes quenching fluid to be ejected through the spray head 119 over the treated surface of the work, the amount of quenching fluid being determined by the quench supply cylinder 136 (Figure 1).

At the end of the 14th second in the cycle the quench-control cam 174 moves from under its cam switch 180 permitting the switch to open, thus deenergizing the electro-magnetic control valve solenoid 197 of the quenching system. Soon after this, say at the 15th second in the cycle the piston rod control cam 171 moves from under its cam switch 177 which opens the circuit of the electro-magnetic control solenoid 118 permitting air to flow into the bottom of working cylinder 116 which raises the piston rod 25 and spray head 119 out of operative relation with the work. The piston rod 25 moving to its uppermost position opens the limit switch 166. Immediately following this, at a point in the cycle marked 15a, the master cam 170 permits its cam switch 176 to open and remain open for a very brief time, for example, until the 16th second in the cycle. This momentary opening of the master cam switch 176 opens the energizing circuit of the locking relay 169 through conductor 182 which relay deenergizing permits its armature to fall back, opening its locking circuit at contacts 188. Deenergization of the locking relay 169 also opens contacts 189 and 190 and closes the signal lamp control contacts 191. At the beginning of the 17th second in the cycle, the cam 175 moves under its cam switch 181 closing the switch and completing the circuit of the signal lamp, which circuit may be traced from line 196 through contacts 191 of locking relay 169, signal lamp 167, conductor 186, cam switch 181 to line 187.

Should the operator fail to reload until after the reloading period has ended, the relay 169 cannot become energized until the push button 168 is operated while contacts 181 are closed, and to apprise him of the closure of contacts 181 the circuit arrangement is such that upon closure of contacts 181 the signal lamp 167 becomes energized through contacts 191 of relay 169. The operator noting the lighting of lamp 167 operates the push button switch 168 which completes the energizing circuit of relay 169. This circuit may be traced from line 196, through cam contacts 176, conductor 182, relay 169, conductor 183, loop circuit 198 closed at 168, conductors 185, 186, contacts 181 to line 187.

While the heating unit H is in the operative position shown in Figures 7 and 9, and energized by the high frequency current supplied through the transformer switching mechanism T, currents of considerable magnitude are induced in the adjacent section of the hub 26 and concentrated at and near the inner or bearing surface, raising the temperature in an inner annular zone substantially of the depth and length indicated by dotted line 105 in Figure 9, to the desired heat treating temperature.

As soon as sufficient heating has occurred, the heating unit H is withdrawn leaving the spray head 119 in the position shown in Figure 10, immediately after which the work is quenched by the spray of quenching fluid ejected through the spray head against the work as indicated in Figure 10. In the present example where quenching fluid is a liquid, the volume and rate of flow is made sufficient to overflow the hub interior and over and around the exterior of the hub as indicated in Fig. 6. The work being suitably quenched, the spray head is withdrawn upwardly from the work piece leaving the work piece in the desired heat treated condition in the annular zone indicated by the dotted line 105 in Figure 9.

It will be noted from Figures 7 and 9 that with the heating unit in operating position within the hub 26, the inwardly offset lower end portion of the magnetic ring 70, fits within the rabbeted portion in the upper end of the hub substantially filling the gap in the magnetic circuit between the upper end of the laminated core element of the heating unit and the upper end of the hub 26. The lower end of the magnetic ring 70 by thus completing the magnetic circuit through its body material of low reluctance, maintains the path of the magnetic flux through the core of the heating element and the work to be treated at the smallest possible or minimum reluctance with consequent increase in efficiency. As the heating coil is withdrawn from the work moving out of the surrounding field of low reluctance afforded by the surrounding iron of the hub, it moves into the ring 70 of magnetic material, thus preventing undue change in its magnetic reluctance and thereby avoiding substantial variation in the power factor characteristic of the circuit.

Figure 16:
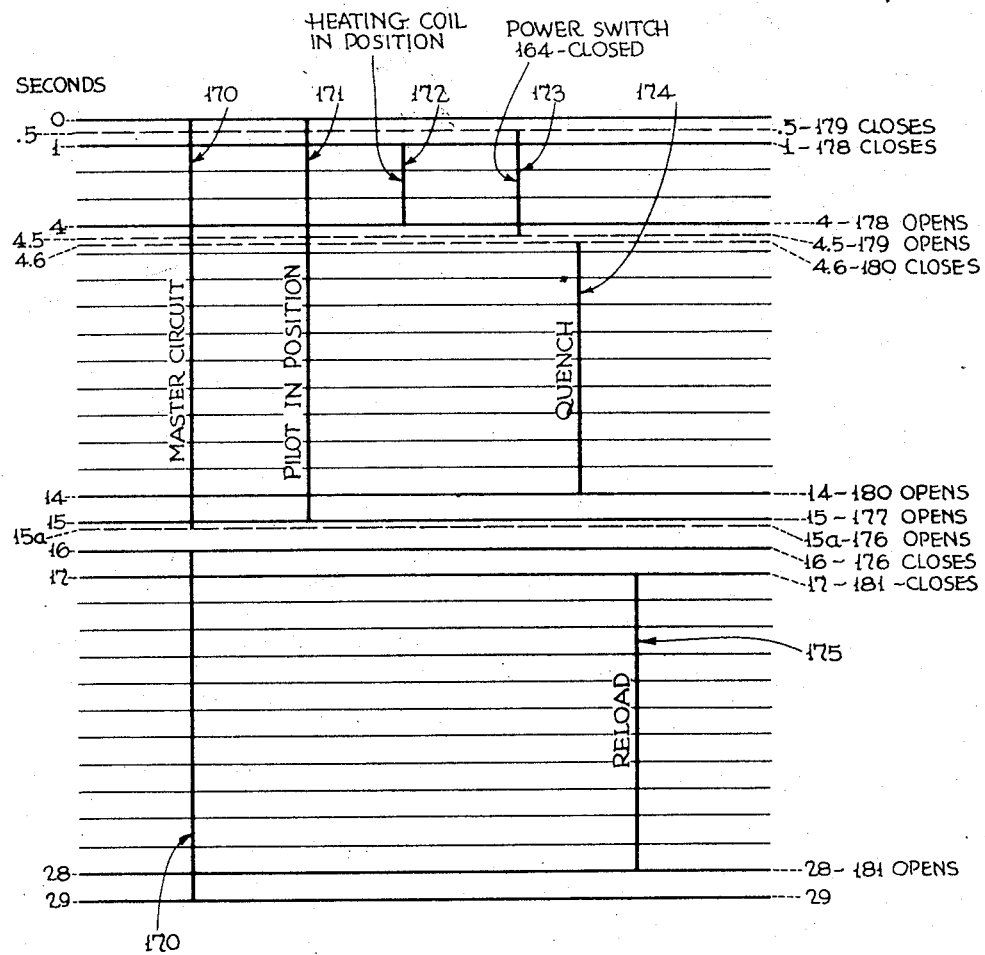
Fig. 16 is a time diagram similar to Fig. 14 showing a variation in timing wherein the automatic power switch closes before coupling movement of the transformer elements and opens after uncoupling movement of the transformer elements.

Referring to the timing diagram of Fig. 16 which illustrates the previously described case wherein the power switch 164 closes before the transformer secondary coil 94 moves into transformer relation with the primary coil 89 and does not open until after the secondary coil 94 moves out of its transformer relation with the primary coil, this diagram is substantially the same as that of Fig. 14 with the exception that the cam 173 is made longer than cam 172 so that cam 173 will close its switch 179 before cam 172 closes its switch 178, and so that cam 172 will open switch 178 before cam 173 opens switch 179. In order to illustrate this condition, the cam 173, is illustrated as active .5 of a second after the start of the cycle to close switch 179 to effect closure of power switch 164, and the cam 172, which effects through switch 178 movement of the transformer secondary coil 94 and the heating coil 63 into operative heating position, is illustrated as active 1 second after the start of the cycle to close switch 178. During the period between 1 second and 4 seconds the heating coil 63 is operative and at the termination of this period cam 172 opens switch 178 whereby the heating coil 63 and the transformer secondary coil 94 move back to normal condition out of coupling relation with the transformer primary 89. The primary 89, however remains energized until 4.5 seconds at which time cam 173 opens cam switch 178 to deenergize the power switch circuit and thereby open the power switch 164. At 4.6 seconds, quench cam 174 closes cam switch 180. From this point the cycle of operation may be the same as that illustrated in Fig. 14. As previously described, the transformer thus serves as a switch to energize the heating coil as the transformer elements move into coupling relation and to deenergize the heating coil as these elements move out of coupling relation.

The modification shown in Figs. 12 and 12a is very similar to the heating element shown in the preceding figures except that the magnetic ring or sleeve 207 is built up of tapered radial laminations, certain improvements are made in the arrangement of channel 209 for circulation of the cooling fluid, the fluid connection 210 for the lower terminal of the heating coil is varied in the interest of simplicity of assembly, and the spray head 211 provided with a pressure operated valve 212. The laminations comprising the magnetic sleeve 208 are tapered and arranged radially in a manner similar to the arrangement of the tapered, radial laminations of the magnetic cores of the heating coil and transformer previously described, and are held in assembled relation as shown by the upper and lower clamping rings 213 and 214 clamped together by sets of clamping bolts 215 and 216, the clamping rings being provided with annular wedge rings 217, 218 which engage complementary notches in the laminations constituting the magnetic ring 208. The small winding 219 has no electrical function in the assemblage, but is simply a binding wire or cord having the purely mechanical function of holding the laminations of the sleeve 208 in assembled relation especially during assembly of the parts. The several short and long bolts 215, 216 are alternated about the structure, the long bolts 216 serving also to clamp the bearing ring 220 on to the top of the magnetic sleeve assembly, the bearing ring 220 bearing at its inner surface against the cylindrical surface 221 of the inner cylindrical supporting member 222.

The cooling liquid, return channel 209 through the piston rod 24a is simplified by providing it in the form of a long bore passing upwardly from the lower end of the piston rod 24a intermediate the inner and outer walls thereof, the bottom of the bore being closed by a suitable stop plug 223. Connection is made between this channel 909 and the lower terminal end 224 of the heating coil, through a sector shaped plug 210 inserted in the lower end of the laminated core of the heating coil and provided with a channel 226 connecting the channel at the end of the heating coil with the channel 209.

The pressure operated valve 212 in the spray head 211 is in the form of a hollow cylindrical valve element closed at the bottom and open at the top for communication with the channel 227 in the pilot arbor 119. The valve member 212 is provided with a suitable number of ports 151 corresponding in number to the number of spray holes 229 in the spray head 211 and arranged to register therewith to connect them with the channel 227 of the piston rod upon movement of the valve from the normal closed position shown to its lowermost position at which it is stopped by engagement of the outer bottom portion 230 of the valve element with the upper end 231 of the pilot head 130a. A compression spring 232 urges the valve element 212 upwardly against the stop pin 233 fixed in the cylindrical wall of the spray head and passing through axially extending slots 234 in the upper end of the valve element 212, the pin slidably engaging the surfaces of such slots to maintain the ports in the sliding valve element 212 in proper angular relation with the spray openings in the spray head.

While the operation herein described for the purpose of disclosure is one for effecting a hardening of the bearing race portion of an automobile wheel hub, it is to be understood that other forms of heat treatment and the heat treatment of various other objects may be accomplished by suitable variation in the cycle of operations or the relative timing of the different phases of the cycle, or by suitable adjustments or modifications of the apparatus.

It is also to be understood that while I have shown and described certain specific embodiments of my invention for the sake of disclosure, the invention is not limited to such specific embodiments but contemplates all such variants and modifications thereof as fall fairly within the scope of the appended claims.

What I claim is:

1. Apparatus for heat treating hollow objects from the inside, comprising a heating unit and a quenching unit, and a support for slidably mounting said heating unit for movement into and out of the hollow object the quenching unit being slidable within the heating unit for relative movement into and out of the hollow of the object to be heat treated, together with means carried by the quenching unit arranged to engage the work and space the quenching unit with respect to the work.

2. Apparatus for heat treating a hollow workpiece by electromagnetic induction from the inside, comprising an annular induction heating unit, a quenching unit coaxial therewith, supporting means for said quenching unit and having a passage therethrough for supplying quenching medium to said quenching unit, said heating unit surrounding said supporting means and being slidable thereon, motor means for sliding said supporting means through said heating unit to move said quenching unit into and out of the hollow of the workpiece, and motor means for sliding said heating unit along said supporting means into and out of the hollow of the workpiece, together with means for acuating both said motor means to sequentially move said heating and quenching units.

3. Apparatus for heat treating a hollow cylindrical work piece from the inside by electromagnetic induction, comprising a hollow guide rod element, and a quenching fixture carried at one end of said rod element, a support for slidably supporting said rod, a work holder for supporting a hollow cylindrical work piece with its hollow portion in working alignment with said rod, motor means for axially moving said rod to move said quenching fixture into quenching relation with the work piece, a sliding support slidably mounted on said rod, an inductive heating coil and a transformer secondary element mounted in tandem on said sliding support and electrically connected with each other, a transformer primary element arranged to receive said secondary element, motor means for moving said sliding support along said rod to move said heating coil into operative engagement with the work piece and said secondary element into transformer relation with the primary element, means for directing quenching fluid through said hollow rod to said quenching fixture and control means for controlling the operation of both said motor means and the flow of said quenching fluid in predetermined sequence.

4. Apparatus for heat treating hollow objects from the inside by electric inductive heating comprising a pilot member arranged to be extended into the hollow of the object to be heat treated in fixed relation therewith and an inductive heating coil mounted to slide along said pilot member into operative relation with the interior of said hollow object, said pilot member carrying a spray member for applying quenching fluid to the interior of the hollow object.

5. Apparatus for heat treating hollow objects from the inside by electric inductive heating comprising a pilot member arranged to be extended into the hollow of the object to be heat treated in fixed relation therewith and an inductive heating coil mounted to slide along said pilot member into operative relation with the interior of said hollow object, said pilot member carrying a spray member for applying quenching fluid to the work and being in the form of a tube conducting quenching fluid to the spray member.

6. Apparatus for induction heat treatment of the internal peripheral surfaces of hollow articles comprising a frame, a work holder for securely holding a hollow workpiece during heat treatment, an induction heating head, a quench head for discharging quenching medium against the continuous peripheral workpiece surface to be heat treated and having a hollow coaxial supporting arbor for supplying quenching medium to said quench head, said quench head and arbor being fixed to each other, said work holder, said heating head and said quench head being constrained to axial alignment, one of which is fixed with respect to said frame and the other two being axially relatively movable with respect to said one and with respect to each other to effect concentric operative heating and quenching relation of said workpiece as held by said work holder with said heating and quench heads respectively, said quench head supporting arbor being concentrically disposed within one of said work holder and heating head, and motor means for effecting such relative movements.

7. Apparatus for inductive heat treatment of the peripheral surfaces of articles hardenable by heating and quenching comprising a work holder for securely holding the article to be heat treated, separate and independent, relatively movable heating and quench-discharging heads for respectively heating and quenching the article surface to be heat treated, said heads being constrained to coaxial alignment with the article surface to be heat treated as held in said work holder and being arranged for concentric coaxial relation with such surface during the respective heating and quenching operations, said heating head and work holder being relatively axially movable to position said heating head and the article held by said work holder in operative heating relation, said quench head and work holder being relatively axially movable independently of the movement of said work holder and heating head to position said quench-discharging head and the article held by said work holder in operative quenching relation, motor means for effecting such movements, and controlling means associated with said motor means for effecting such movements in sequence.

8. Apparatus for inductive heat treatment of peripheral surfaces of articles hardenable by heating and quenching comprising a work support for securely holding the article to be heat treated, an induction heating head, a quenching head, means for maintaining said holder and heads in axial alignment, said heating head and work holder being relatively axially movable to position said heating head and the article to be heated in concentric heating relation, said quenching head and work holder being relatively movable to position said quenching head and the article to be heat treated in concentric quenching relation, said heating head and quenching head being relatively movable and each having a supporting arbor, the supporting arbor for one of said heads being concentric and in bearing engagement with the other for relative movement and interaxial support.

9. In a heat treating apparatus, a work holder, a heating element for heating a workpiece held in said holder, timing means for periodically rendering said heating means effective for a given lapse of time, control means for the timing means arranged to be locked in actuated position and operable when in actuated position to render said timing means effective and when in non-operated position to render the timing means ineffective, actuating means for initiating actuation of the control means, work protecting means associated with the work holder and operable in response to the presence of a workpiece in the holder to render the actuating means ineffective to initiate actuation of the control means and in response to the absence of a workpiece to render the actuating means effective, a first locking means for said control means operable upon actuation of said control means to maintain said actuating means effective to hold the control means in actuated position independently of said work protecting means, a second locking means operable upon actuation of said control means to retain the control means in actuated position during the presence of a workpiece in the holder independently of the said actuating means, said work protecting means being arranged to be actuated before the said second locking means upon placement of a workpiece in the holder, and after said second locking means upon removal of a workpiece from said holder, and means for releasing said control means independently of either said locking means.

10. Apparatus for heat treating a hollow workpiece by electromagnetic induction from the inside, comprising an annular induction heating unit, a quenching unit coaxial therewith, supporting means for said quenching unit having a passage therethrough for supplying quenching medium to said quenching unit, said heating unit surrounding said supporting means and being slidable thereon, a work holder for holding the workpiece to be internally heat treated in axial alignment with said heating and quenching units, separate motor means for axially moving said heating and quenching units relative to each other into and out of concentric heating and quenching relation respectively with the workpiece to be heat treated and means for actuating said motor means to sequentially axially move first said heating and quenching units to within the workpiece to be heat treated, second to move said heating unit from within the workpiece and lastly to move said quenching unit from within the workpiece, together with means under the control of said actuating means to supply electric energy to said heating unit when within the workpiece and means under the control of said actuating means to supply quenching medium to said quenching unit subsequent to movement of said heating unit and prior to movement of said quenching unit from the workpiece.

11. In a heat-treating apparatus, relatively movable induction heating and quenching heads, means for effecting relative movement of said heads, energizable means for supplying high frequency electrical energy to said heating head, a switch closable to effect energization and openable to effect deenergization of said energizable means, actuating means for said switch, and means effective at a predetermined position of relative movement of said heads for causing said switch-actuating means to close said switch whereby the supply of electrical energy to said head is dependent upon a predetermined relative position of said heads.

12. In a heat-treating apparatus, relatively movable induction heating and quenching heads, means for effecting relative movement of said heads, energizable means for supplying high frequency electrical energy to said heating head, a switch closable to effect energization and openable to effect deenergization of said energizable means, actuating means for said switch, a source of quenching medium for said quenching head, connections between said last-named source and quenching head including valve means for opening and closing said connections, actuating means for said valve means, and means effective at a predetermined position of relative movement of said heads for causing said actuating means to respectively close said switch and open said valve means whereby the supply of electrical energy to said head and the supply of quenching medium to said quenching head is dependent upon a predetermined relative position of said heads.

13. In a heat-treating apparatus, relatively movable heating and quenching heads, motor means for effecting relative movement of said heads, energizable means for supplying high frequency electrical energy to said heating head, a switch closable to effect energization and openable to effect deenergization of said energizable means, electrically operable means for actuating said switch, an electrical circuit including said electrically operable means, a source of electrical energy therefor and a normally open limit switch, and means effective at a predetermined position of relative movement of said heads to close said limit switch to energize said electrically operable means, thereby to close said first switch, whereby the supply of electrical energy to said head is dependent upon said heads being in a predetermined relative position.

14. In a heat-treating apparatus, relatively movable heating and quenching heads, motor means for effecting relative movement of said heads, energizable means for supplying high frequency electrical energy to said heating head, a switch closable to effect energization and openable to effect deenergization of said energizable means, electrically operable means for actuating said switch, a source of quenching medium, connections between said quenching medium source and said quenching head including an electrically operable valve for opening and closing said connections, an electrical circuit including said electrically operable means, a source of electrical energy therefor and a limit switch, a third electrical circuit including said last-named source, limit switch and electrically operative valve whereby said valve is in parallel circuit arrangement with said electrically operable means, and means effective at a predetermined position of relative movement of said heads to close said limit switch to energize said electrically operable means and said electrically operable valve, whereby the supply of electrical energy to said head and the supply of quenching medium to said quenching head is dependent upon said heads being in a predetermined relative position.

15. In a heat-treating apparatus, relatively axially movable induction heating and quenching heads each having an electrically actuable motor for effecting axial movement thereof, energizable means for supplying high frequency electrical energy to said heating head, a switch closable to effect energization and openable to effect denergization of said energizable means, electrically operable means for said switch, a quenching medium supply and connections between said supply and quenching head including electrically operable valve means, a source of electrical energy, a circuit including said energy source and the motor for said quenching head, a second circuit paralleling said first circuit and including said energy source and the motor for said heating head, a third circuit paralleling said first and second circuits and including said energy source and said electrically operable means, a fourth circuit paralleling said first, second and third circuits and including said energy source and said electrically operable valve means, a limit switch common to said second, third and fourth circuits for closing and opening the same, and means operative upon axial movement of said quenching head to a predetermined position for actuating said limit switch to closed position, whereby energization of said second, third and fourth circuits is dependent upon said quenching head being in a predetermined position.

16. In a machine for heat treating a workpiece by electromagnetic induction, an induction heating device, a quenching device, a workpiece holder, apparatus for providing relative movement between said holder on the one hand and said heating and quenching devices on the other hand into and out of operative heat treating relation, said devices and apparatus being automatically sequentially operative during successive predetermined cycles of operation within a predetermined heat treating period in each such cycle, means effective to permit said sequential operation, automatically operating means operative to render said first-mentioned means effective at the start of and ineffective at the termination of a predetermined loading period within each said cycle of operation prior to said heat treating period, and means operatable only when a workpiece is in position in said holder within said predetermined loading period to maintain said first-mentioned means effective after the termination of said predetermined loading period to permit said sequential operation during said heat treating period.

17. In a machine for heat treating a workpiece by electromagnetic induction, an induction heating device, a quenching device, a workpiece holder, apparatus for providing relative movement between said holder on the one hand and said heating and quenching devices on the other hand into and out of operative heat treating relation, said devices and apparatus being automatically sequentially operative during successive predetermined cycles of operation within a predetermined heat treating period in each such cycle, means effective to permit said sequential operation, automatically operating means operative to render said first-mentioned means effective at the start of and ineffective at the termination of a predetermined loading period within each said cycle of operation prior to said heat treating period, and means automatically operative only upon the positioning of a workpiece in said holder within said predetermined loading period to maintain said first-mentioned means effective after the termination of said predetermined loading period to permit said sequential operation during said heat treating period, said automatically operating means including means automatically operative upon the insertion of a workpiece in said holder after said predetermined loading period within a given cycle of operation to preclude said first-mentioned means from being automatically rendered effective.

18. In a machine for heat treating a workpiece by electromagnetic induction, an induction heating device, a quenching device, a workpiece holder, apparatus for providing relative movement between said holder on the one hand and said heating and quenching devices on the other hand into and out of operative heat treating relation, said devices and apparatus being automatically sequentially operative during successive predetermined cycles of operation within a predetermined heat treating period in each such cycle, means effective to permit said sequential operation, automatically operating means operative to render said first-mentioned means effective at the start of and ineffective at the termination of a predetermined loading period within each said cycle of operation prior to said heat treating period, and means automatically operative only upon the positioning of a workpiece in said holder within said predetermined loading period to maintain said first-mentioned means effective after the termination of said predetermined loading period to permit said sequential operation during said heat treating period, said automatically operating means including means automatically operative upon the insertion of a workpiece in said holder after said predetermined loading period within a given cycle of operation to preclude said first-mentioned means from being automatically rendered effective, and means manually operative only during the said predetermined loading period of a succeeding cycle to render said first-mentioned means effective.

19. In a machine for heat treating a workpiece by electromagnetic induction, an induction heating device, a quenching device, a workpiece holder, apparatus for providing relative movement between said holder on the one hand and said heating and quenching devices on the other hand into and out of operative heat treating relation, said devices being automatically sequentially operative during a predetermined cycle of operation, a first control means, a second control means and a third control means, said first control means being effective to permit said sequential operation and being under the control of said second and third control means, said second control means being operative upon the presence of a workpiece in said holder to allow said first control means to permit said sequential operation and said third control means being operative upon the absence of a workpiece from said holder to prevent said first control means from permitting said sequential operation.

20. Apparatus for heat treating a workpiece by electromagnetic induction, comprising an induction heating head, a quenching head and a work holder for holding a workpiece to be heat treated, electrically operative devices for effecting the supply of electrical energy to said heating head and the supply of quenching medium to said quenching head, switch means connected with said devices in circuit closing and opening relation, a relay device for said switch means having a normally open-switch position and an operative closed-switch position, an electric circuit including a source of electrical energy, said relay device, and a time-operated switch for actuating said relay to operative closed-switch position when said time-operated switch is closed, a second electrical circuit including said source, said relay device, a first set of normally open contacts closable only upon the presence of a workpiece in said work holder, and a second set of normally open contacts closable upon actuation of said relay to operative closed-switch position to establish a locking circuit for said relay device around said time-operated switch upon opening of said time-operated switch, whereby said relay device is maintained in closed-switch position after opening of said time-operated switch only when a workpiece is in said work holder.

21. In an apparatus for hardening a workpiece by electromagnetic inductive heating and by quenching which comprises an inducing head by means of which a work surface may be rapidly heated, a circuit controlling the supply of high frequency electric current to said head, a quench head, means for supplying quenching fluid under pressure to said quench head, a switch in said control circuit, means for actuating said switch in response to said quench head being in its operative position to make said control circuit, and means for actuating said switch in response to said quench head being moved from its operative position to break said control circuit.

22. An apparatus for hardening a workpiece by electromagnetic inductive heating and by quenching which comprises an inducing head, means for supplying high frequency electric current to said head, a quench head for directing quenching fluid against the work after it has been heated by said inducing head, and means for discharging a measured amount of quenching fluid under pressure from said quench head including mechanism for automatically dropping the pressure on said quenching fluid after discharge of a predetermined amount of quenching fluid, and a valve for closing the quench head against fluid discharge in response to said drop in pressure.

23. In combination, a movable work circuit including a heating coil and transformer secondary winding directly connected and being movable with said work circuit, a primary circuit including a source of high frequency energy and a transformer primary winding, each of said windings having a magnetic circuit element associated therewith, a switch for opening and closing said primary circuit, motive means for moving said work circuit to move said secondary winding into and out of coupled relation with said primary winding, and means independent of the movement of said work circuit and said motive means for effecting in predetermined timed sequence actuation of said switch and motive means.

24. In combination, a movable work circuit including a heating coil and a transformer secondary winding directly connected and being movable with said work circuit, a primary circuit including a source of high frequency energy and a transformer primary winding, each of said windings having a magnetic circuit element associated therewith, a switch for opening and closing said primary circuit, motive means for moving said work circuit to move said secondary winding into and out of coupled relation with said primary winding, and means independent of the movement of said work circuit and said motive means to effect in predetermined timed sequence circuit-closing movement of said switch prior to transformer-coupling movement of said secondary winding and to effect transformer-uncoupling movement of said secondary winding prior to circuit-opening movement of said switch.

25. In an induction heating apparatus having a work holder for holding a workpiece to be heated, an inducing coil for heating a workpiece held in said work holder and a source of electrical energy for said coil, timed means for establishing a coil energizing circuit through said source and coil for a predetermined period, and means responsive to the presence only of a workpiece in said work holder for maintaining said energizing circuit throughout such period, said timed means being effective to reestablish said energizing circuit for a subsequent corresponding predetermined period only after removal of the workpiece from the work holder and then only upon reinsertion of a workpiece in said work holder.

HOWARD E. SOMES.